US005985439A

United States Patent [19]

Ritter

[11] Patent Number: 5,985,439

[45] Date of Patent: Nov. 16, 1999

[54] TRANSFER BELT FOR APPLYING ADHESIVE AND A PROCESS FOR MANUFACTURING THE SAME

[76] Inventor: Johannes A. Ritter, Frankensteiner Strasse 44, Seeheinm-Jugenheim, Germany, 64343

[21] Appl. No.: 09/077,365

[22] PCT Filed: Nov. 29, 1996

[86] PCT No.: PCT/EP96/05306

§ 371 Date: May 28, 1998

§ 102(e) Date: May 28, 1998

[87] PCT Pub. No.: WO97/20006

PCT Pub. Date: Jun. 5, 1997

[30] Foreign Application Priority Data

Nov. 30, 1995 [DE] Germany ........................... 195 44 636

[51] Int. Cl.[6] ............................... B05C 1/08; B32B 31/00

[52] U.S. Cl. .......................... 428/343; 156/579; 428/354; 428/352; 428/906; 427/208; 427/208.4; 427/208.8

[58] Field of Search .................................... 428/354, 352, 428/343, 906; 427/208, 208.4, 208.8; 156/579, 523, 541, 577

[56] References Cited

U.S. PATENT DOCUMENTS

| | | | |
|---|---|---|---|
| 3,691,140 | 9/1972 | Silver | 260/78.5 |
| 5,348,793 | 9/1994 | Stettner . | |
| 5,380,395 | 1/1995 | Uchida . | |
| 5,514,435 | 5/1996 | Suzuki et al. . | |

FOREIGN PATENT DOCUMENTS

| | | |
|---|---|---|
| 43 05 081 | 8/1986 | Germany . |
| 42 10 329 | 10/1993 | Germany . |
| 5-043847 | 2/1993 | Japan . |
| 6-271822 | 9/1994 | Japan . |

*Primary Examiner*—Daniel Zirker
*Attorney, Agent, or Firm*—Jacobson, Price, Holman & Stern, PLLC

[57] ABSTRACT

Described is a transfer web, whose upper side is coated with a first releasing agent and whose underside is coated with a second releasing agent, whereby the second releasing agent exhibits a significantly greater peel force than the first releasing agent. To expand the possible applications of the web, it is provided that the first releasing agent is coated with self-adhering pressure sensitive adhesive in order to transfer the pressure sensitive adhesive onto blanks (sheets) of paper or similar material. Furthermore, a process for the manufacture and a device for the use of the transfer web are described

9 Claims, 4 Drawing Sheets

TRANSFER BELT FOR APPLYING ADHESIVE AND A PROCESS FOR MANUFACTURING THE SAME

The invention proceeds from a transfer web, whose upper side is coated with a first releasing agent and whose bottom side is coated with a second releasing agent, wherein the second releasing agent exhibits a significantly greater peel force than the first releasing agent, and a process for manufacturing the transfer web and a device for the use of the same.

The document DE-A-43 05 081 describes a process and a device for applying self-adhering pressure sensitive adhesive to sheets of paper or similar material, in which process the slightly overlappingly conveyed sheets are coated with a primer on the upper side and coated with a release on the bottom side and subsequently fed to a pressure sensitive adhesive application station. The overlapping has the purpose of producing a continuous stream of sheets without space between the individual sheets in order to apply the primer and release. The pressure sensitive adhesive is applied on the upper side of the sheet by means of a continuous transfer tape, on which are applied pressure sensitive strips, which extend in the direction of feed and are spaced a specified distance apart. Subsequently the sheets, coated with pressure sensitive adhesive, are stacked and cut into adhesive slips of paper of the desired size.

This process has the drawback that a relatively complicated and thus expensive machine is required to carry out said process, so that its procurement is out of the question for many operations. The handling of the pressure sensitive adhesive requires the employment of trained and experienced specialists.

Therefore, the object of the invention is to design the process, described in the introductory part, in such a manner that it can be realized inexpensively.

The aforementioned transfer web provides, according to the invention, that the first releasing agent is coated with a self-adhering pressure sensitive adhesive in the form of an aqueous dispersion of a bead polymerizate in order to transfer the pressure sensitive adhesive to sheets of paper or the like material. Thus, the transfer web can be coated with pressure sensitive adhesive at the central place and made transportable together with the pressure sensitive adhesive applied to it. Thus, anyone, who wants to coat his/her sheets of paper with pressure sensitive adhesive, is relieved of the problem of having to produce the transfer tape coated with pressure sensitive adhesive, which he/her can acquire ready-to-use from the central place. Thus there is no longer any need for personnel experienced with the handling of pressure sensitive adhesive; and a device for the transfer of pressure sensitive adhesive from the transfer web to the sheets of paper becomes significantly simpler and less expensive.

If the transfer web is provided with a first silicone-based releasing agent, it is recommended that a starch-based thickening agent and optionally also a wetting agent be added to the dispersion prior to coating. Expedient configurations of the transfer web coated with pressure sensitive adhesive are disclosed in the dependent claims.

The aforementioned transfer web can be manufactured in a simple manner in that the first releasing agent is coated with self-adhering pressure sensitive adhesive in the form of an aqueous dispersion of a bead polymerizate in order to transfer the pressure sensitive adhesive to sheets of paper or the like material. It is recommended that a starch-based thickening agent and optionally a wetting agent be added to the dispersion prior to coating.

A device for using the transfer web of the invention provides a first storage device for the rotatable holding of a supply roll comprising the transfer web, coated with pressure sensitive adhesive; a transfer section with pressure and counter-pressure roller; and a second storage device for receiving a sleeve for the rewinding of the transfer web, which is rolled up on a roll, and a sheet feeding device. Therefore, the storage devices can be arranged above or below the sheet feeding device.

When the sheets are fed so as to be shingled or staggered to the slit between pressure and feed roller, it has been proven to be exceptionally expedient that the leading edge of a following sheet lie always over the preceding sheet, so that the sequence does not change for sheets that are printed and collected differently. However, the result is a continuous web of paper and thus it is guaranteed that the transfer web can transfer the pressure sensitive adhesive onto the entire area of the shingled or staggered sheets.

The staggering or shingling can be realized, for example, by arranging below the contact area of a stack of sheets a sheet removing device, which follows a shingling or staggering device in the feed direction, whereby the sheets are removed individually at a higher speed from the bottom of the stack and are decelerated in such a manner in the shingling or staggering device that the sheets are shingled or staggered to a specified height. Furthermore, it is recommended that the degree to which the sheets are decelerated in the staggering device be controlled in accordance with a desired height. If the height is very small, as desired, for example, for self-adhering slips of paper, one also talks about shingled sheets. A higher stagger height is especially suitable for the manufacture of self-adhesive labels.

The said device opens two possibilities:

1.) The transfer web is fed with the pressure sensitive adhesive face down from the upper unwinding unit in the shape of an S between pressure and counter-pressure roller. There the pressure sensitive adhesive bonds in the front with the shingled or staggered sheets and "pulls" them along to the rewindup unit.
2.) The transfer web is fed with the pressure sensitive adhesive face up from the bottom unwinding unit in the shape of a U between pressure and counter-pressure roller. There the pressure sensitive adhesive bonds in the rear with the shingled or staggered sheets and "pushes" them to a vacuum roller. While the transfer web is pulled angularly over an edge breaker downward into the rewindup unit, the vacuum roller pulls the sheets with adhering rear end from the transfer web and deposits them in a sheet collector.

Other preferred embodiments of the invention are disclosed in the dependent claims.

In the following the invention is described in detail with reference to the embodiments, depicted in the attached drawings.

Figure 1:
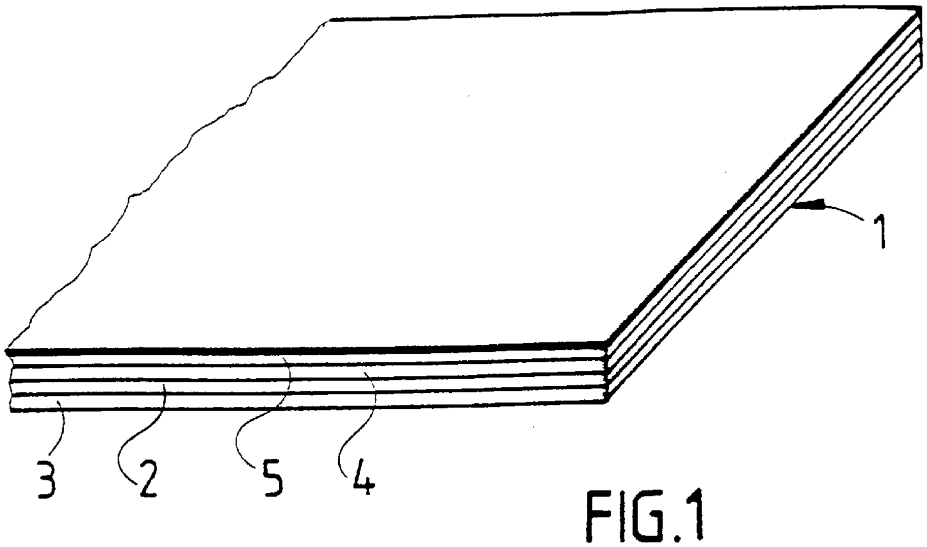
FIG. 1 is a perspective view of a section of a transfer web.

The transfer web 1, according to FIG. 1, consists of a paper-like carrier web 2. The carrier web can be made, for example, of Kraft paper having a weight per unit area of about 100 g/cm$^2$ or a non-extensible polypropylene film having a weight per unit area of about 50–60 g/cm$^2$. The entire surface of the carrier web 2, which is to be coated and faces upward in the drawing according to FIG. 1, is coated with a first releasing agent 4. The entire opposing reverse side of the carrier 2 is coated with a second releasing agent 3. The first releasing agent and the second releasing agent are chosen so that the first releasing agent 4 is less repellent to the pressure sensitive adhesive 5 to be applied subsequently on its entire surface, thus has less peel force than the second releasing agent 3 has with respect to this pressure sensitive adhesive 5.

If a silicone-based layer is used as the releasing agent, the degree of non-stickiness can be set through the choice of the layer thickness. Thus, the first releasing agent can comprise a silicone layer having a weight per unit area of 3 g/cm$^2$ for example, and the second releasing agent can comprise a silicone layer having a weight per unit area of 5 g/cm$^2$ for example. In any case the silicone layer of the first releasing agent 4 is chosen so thin that it can cause small regions of the carrier web to protrude, to which regions the pressure sensitive adhesive can bond. The first releasing agent 4 can contain a silicone-based agent that promotes wetting, but does not impede transfer, such as Lumiten from BASF, and optionally a starch-based thickening agent, such as Colargral from BASF. In contrast, the silicone layer of the second releasing agent 3 is made so thick that it totally closes the carrier web 2 to the pressure sensitive adhesive; and, therefore, the pressure sensitive adhesive has no means of sticking.

A suitable pressure sensitive adhesive 5 is a bead polymerizate, as described, for example, in the U.S. Pat. No. 3,691,140 or the German patents 28 36 319 or 24 17 312. Usable is also a permanent pressure sensitive adhesive, for example, for manufacturing self-adhesive labels, said adhesive having a significantly finer particle size than a bead polymerizate.

The said bead polymerizate exists as an aqueous dispersion prior to coating. If the said silicone layer is used as the releasing agent, a starch-based thickening agent is added in suitable quantity to the dispersion prior to coating in order to improve the adhesion of the dispersion on the first releasing agent.

A suitable thickening agent is, for example, the product, which is commercially available under the name Colagral. Moreover, a wetting agent, for example the agent, which is available from BASF under the name Lumiten, can also be added. These agents, which are added to the dispersion prior to coating, guarantee an adequate wetting of the dispersion, containing the bead polymerizate, on the first releasing agent of the transfer web.

Figure 3:
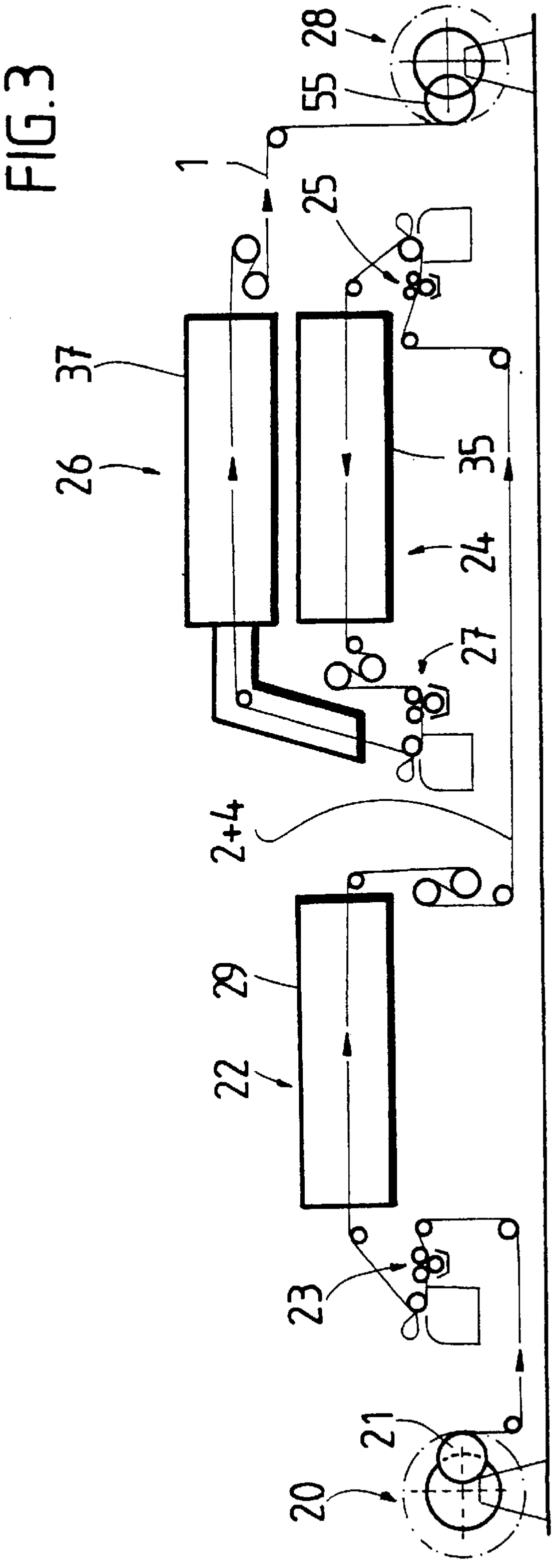
FIG. 3 is a schematic of a device for manufacturing the transfer web according to FIG. 1.

The transfer web 1 can be manufactured, for example, with the system, shown in FIG. 3, where the one unwinding station 20, three coating stations 22, 24, 26 and a winding-up station 28 are arranged in succession. In the unwinding station 20 the carrier web 2 is unwound continuously from a carrier web roll 21, mounted on frames so as to rotate around a horizontal axis, and is fed over deflecting rolls to an application unit 23 of the first coating station 22. In the first application unit 23 a silicone solution is applied on the upper side of the carrier web 2 by means of an application roller, revolving in a silicone bath, and is then calendered off to the desired thickness. The Lumiten and eventually also the Colargral may be added to the silicone bath. The carrier web 2, coated with a weak silicone layer on the upper side, is conveyed downstream through a first drying unit 29, in which the solvent or dispersing agent for the silicone is expelled from the applied dispersion, so that a thin silicone layer is applied as the first releasing agent 4 on the upper surface of the carrier web 2, left in the first drying unit 29. The carrier web, thus prepared, is conveyed in the direction of feed through a second coating unit 25, in which another silicone layer is applied on the rear side of the carrier web by means of another application roller and then adjusted to the desired layer thickness. The carrier web is conveyed downstream through a second drying unit 35, in which the solvent or dispersing agent for the rear-sided coating of the carrier web 2 is expelled so that the upper side of the carrier web 2, left in the second drying unit 35, is provided with the first releasing agent 4 and the rear side, with the second releasing agent 3 exhibiting a greater layer thickness. The carrier web 2, equipped so far, is conveyed downstream behind the second drying unit 35 through a third coating unit 27, in which a dispersion of the bead polymerizate is applied on the first releasing agent by means of another application roller. Previously the aforementioned thickening agent and the wetting agent had been added in the desired quantity to the bead polymerizate dispersion contained in the trough, in which the application roller revolves. The quantity of added thickening agent may be only so large that, after applying a coating of the pressure sensitive adhesive dispersion on the first releasing agent a cohesive, in essence single-layered bead layer of pressure sensitive adhesive is obtained on the first releasing agent 4 of the carrier web 2. Following passage through a stripping step, which strips excess dispersion from the coating, the carrier web is conveyed through a third drying unit 37, in which all of the water of the adhesive coating and the thickening agent and the wetting agent is expelled. Thereafter a transfer web 1, whose rear side is provided with the second releasing agent of higher peel force and whose upper side is provided with a releasing agent of less peel force and on which there is a pressure sensitive adhesive in the form of a bead polymerizate, leaves the third drying unit 37.

The transfer web 1 is wound on a supply drum into a roll 55 in the winding station 28. Following severance of the wound up transfer web from the transfer web 1, delivered later from the third drying unit 37, the roll 55 with the wound up transfer web is ready for transport.

Figure 4:
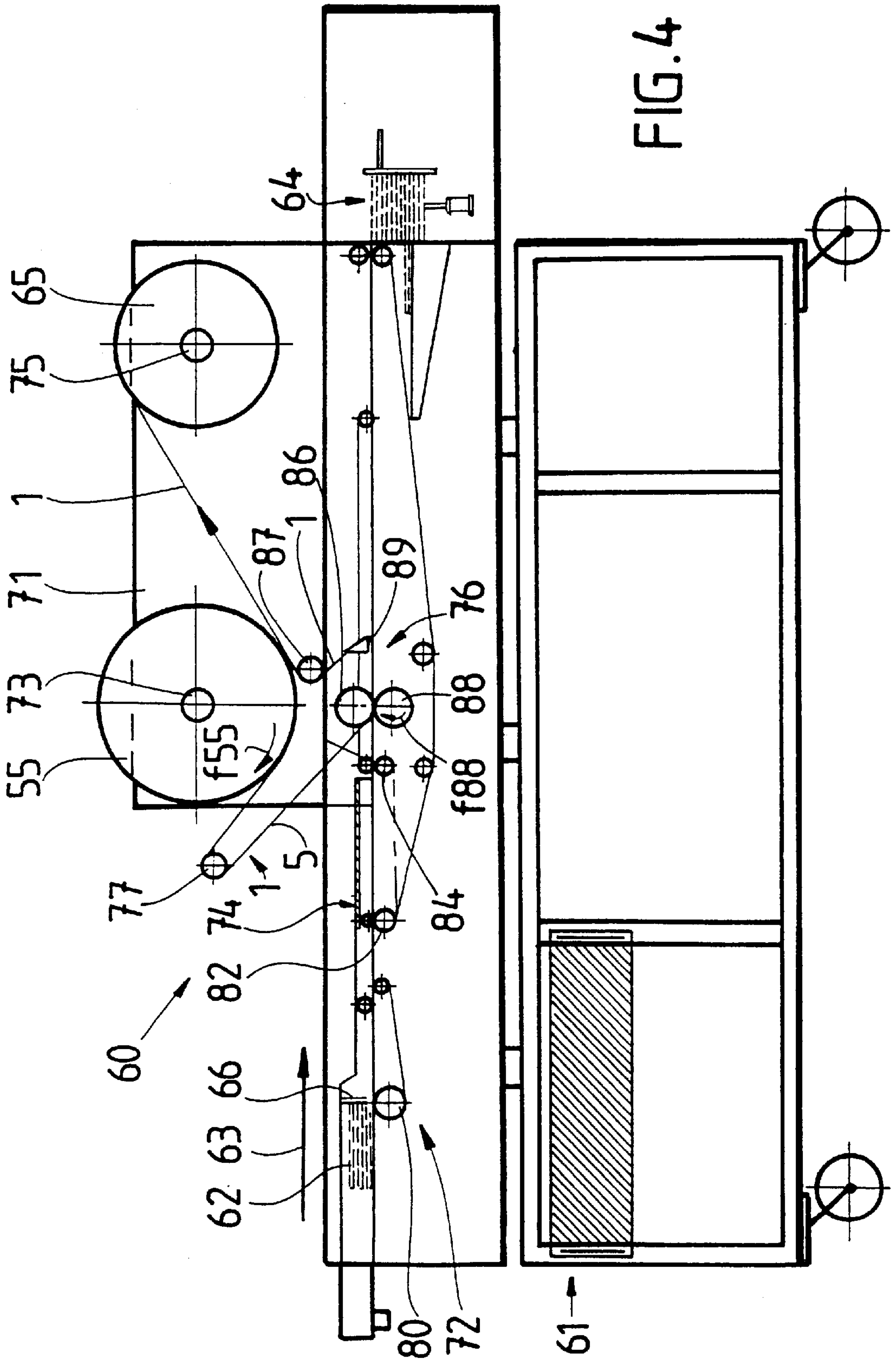
FIG. 4 is a schematic of a device for the transfer of the pressure sensitive adhesive onto the sheet shingling according to FIG. 2.

The pressure sensitive adhesive 5, applied on the transfer web 1, is applied to sheets of paper or similar material in the device, all of which is marked 60, according to FIG. 4. The device 60 rests on a traversible underframe 61, in which the drives for the different rollers, to be described below, are housed. Each sheet from a stack of sheets 62, whose leading edge rests against a contact surface 66, is transported in the direction of feed through the device 60 and is delivered at the end of the device 60 into a sheet collector 64 or wound on a roll 65.

The device 60 exhibits a singulation section 72, a shingling and staggering device 74, which follows said singulation section in the direction of feed 63, and a transfer section 76, which follows the staggering section 74.

The singulation section 72 exhibits a suction roller 80, which is arranged below the contact surface 66 of the stack 62, and is driven so as to rotate around its axis, which runs parallel to the front edge of the stack 62, at a high speed of, for example, 10,000 revolutions per hour (depending on the type of sheet). The suction roller 80 is a hollow roller and exhibits on its periphery several, identically distributed, concentric suction slits. Inside the hollow roller is located essentially permanently a suction channel, which ends directly below the suction slit, next to the bottom-most sheet of the stack 62. When the suction channel is attached to a suction pump and the suction roller 80 is set into rotation (and in particular in the drawing according to FIG. 4 in the clockwise direction), the bottommost sheet of the stack 62 is sucked in by a suction slit that runs by below said bottom-most sheet, and is pulled off below the stack 62 in the direction of feed 63. The pulled off sheet arrives directly behind the suction roller between two rollers (not illustrated) of a pair of rollers, of which one is driven and imparts to the pulled off sheet a relatively high rate of feed, which is equivalent to the rate, at which the sheet has been pulled off from the stack 62. Therefore, the sheets of the stack 62 are pulled off from the stack in succession from the bottom, whereby the leading edge 33 of a following sheet 12 still lies slightly over the trailing edge of a preceding sheet 11.

Figure 2:
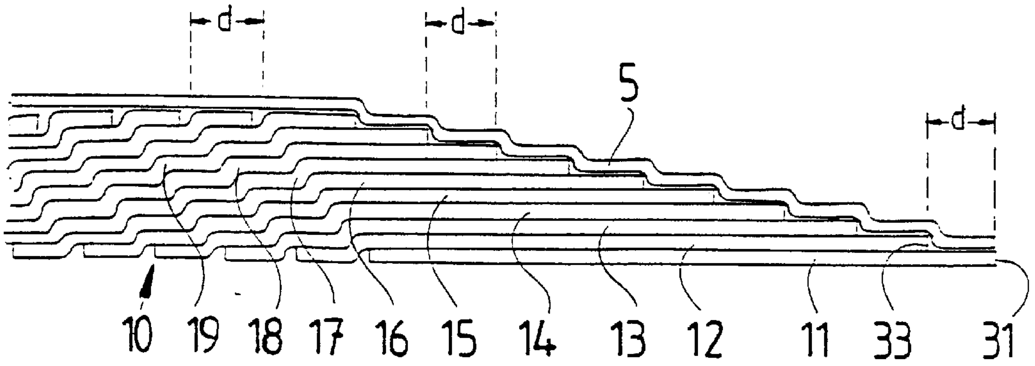
FIG. 2 is a diagrammatic side view of a sheet shingling or staggering, onto which the pressure sensitive adhesive has been transferred.

The shingling and staggering device 74 exhibits two pairs of rollers 82, 84, which are spaced apart in the feed direction 63 and of which one roller is driven. The velocity, at which the rollers of the pairs of rollers 82, 84 are driven, is significantly less than the rate, at which a sheet is pulled from a stack 62. Therefore, a following sheet slides further over the upper side of a sheet, preceding in the direction of feed 23, and in particular to such an extent that between the leading edge 31 of a preceding sheet 11 and the leading edge 33 of the next following sheet 12, which lies almost totally on said preceding sheet, there remains a constant section d, called the shingle or stagger height (FIG. 2). Therefore, a staggering or shingling, which is depicted schematically in FIG. 2, is obtained by decelerating the sheet, pulled off from the stack 62 by the suction roller 80, in the staggering device 74. This staggered or shingled stream of sheets 10 of successive sheets, which lie largely on top of one another, as illustrated in FIG. 2 with the aid of sheets 11, 12, 13, 14, 15, 16, 17, 18, 19, is characterized in that said distance d remains between the leading edges of the sheets that follow one after the other in the direction of feed 23. This distance can amount to 1.5 to 2.0 cm in a concrete embodiment (=shingling). By increasing the drive velocity of the driven rollers of the pair of rollers 82, 84, the degree of shingling or staggering, i.e. the size of d, can be increased as desired (=staggering).

The shingled or staggered sheets arrive after the device 74 between a pressure roller 86 and a bottom counter-pressure roller 88 of the transfer section 76, which is mounted elasticly in the direction of the pressure roller, thus driving one of the two. The pressure roller 86 and the counter-pressure roller 88 lie in the path of the transfer web 1 through the device 60. Furthermore, a solid stand 71, from which project two mandrels 73 and 75, spaced apart in the direction of feed 63, rises above the passage route of the sheets through the device 60. On the front-most mandrel 73 sits a roll 55, which has been produced by the device according to FIG. 3 and contains a wound transfer web 1, which is coated with pressure sensitive adhesive 5. When the counter-pressure roller 88 from the transfer section 76 is driven in the direction of the arrow f 88, the roll 55 rotates in the direction of the arrow f 55, because, after the transfer web is pulled off from the roll, the transfer web is guided over a deflecting roller 77 and from it into the slit between the pressure roller 86 and the counter-pressure roller 88. Above the pressure roller 86 there is another deflecting roller 87, and in the direction of feed 63 behind the deflecting roller 87 there is a separating strip 89, which extends at right angles to the feed direction 63 close above the stream of sheets. The transfer web 1, coming out of the gap between pressure roller 86 and counter-pressure roller 88, is guided around the separating strip 89 and from it to the deflecting roller 87, so that the transfer web runs around the deflecting roller 87, forming an obtuse angle relative to the feed direction 63 and from it wound on the roll 65, which is sitting on the mandrel 75 and driven so as to rotate synchronously with the counter-pressure roller 88.

The staggered sheets enter the slit between the pressure roller 86 or the pressure sensitive adhesive 5 of the transfer web 1 and the counter-pressure roller 88 and comes there under pressure in contact with the exterior of the pressure-sensitive adhesive 5. Since the upper side of the sheets of the stack 62 is coated with an adhesion promoter at least over a width d, starting from the leading edge of the sheet, the pressure sensitive adhesive 5 is transferred onto that part of the upper side of a sheet that remains free, i.e. not covered by the next following sheet, thus on a strip having a width d, which lies parallel to the leading edge 31 of the front-most sheet 11, and sticks there, when the transfer web 1 and the staggered sheets pass together between the upper pressure roller 86 and the counter-pressure roller 88. When the staggered sheets pass between the rollers 86 and 88, a cohesive layer of pressure sensitive adhesive 5 is transferred from the first releasing agent 4 of the transfer web 1 to the front-most sheet sections of width d.

The further path of the staggered or shingled (depending on the size of d) sheets, coated in this manner with a pressure sensitive adhesive, leads then from the transfer section 76 to the sheet collector 64, upon which the staggering of the sheets is cancelled and finally the sheets are deposited one on top of the other, as illustrated, as a stack. Of course, the rear side of the sheets is coated with a release so that the sheets, whose upper side is provided with a pressure sensitive adhesive, do not stick together. The transfer web, liberated of the pressure sensitive adhesive, runs from the deflecting roller 87 to the roll 65.

If, in contrast, the transfer web is pulled off at an acute angle relative to the feed direction 63, the shingled or staggered sheets, sticking to the pressure sensitive adhesive, are dragged along by the transfer web, which is still coated with pressure sensitive adhesive, and guided over the other deflecting roller 87 and also wound on the roll 65. To this end, the separating strip 89 in FIG. 4 is removed; and the roller 87 is moved much farther to the right.

When the length of the transfer tape, wound on the roll 55, is consumed, the transfer tape 1 is then totally on the roll 65 without any pressure sensitive adhesive. Then it can be fed again as the roll 50 to the unwinding station 20, described above in connection with FIG. 3, and coated again with pressure sensitive adhesive.

Figure 5:
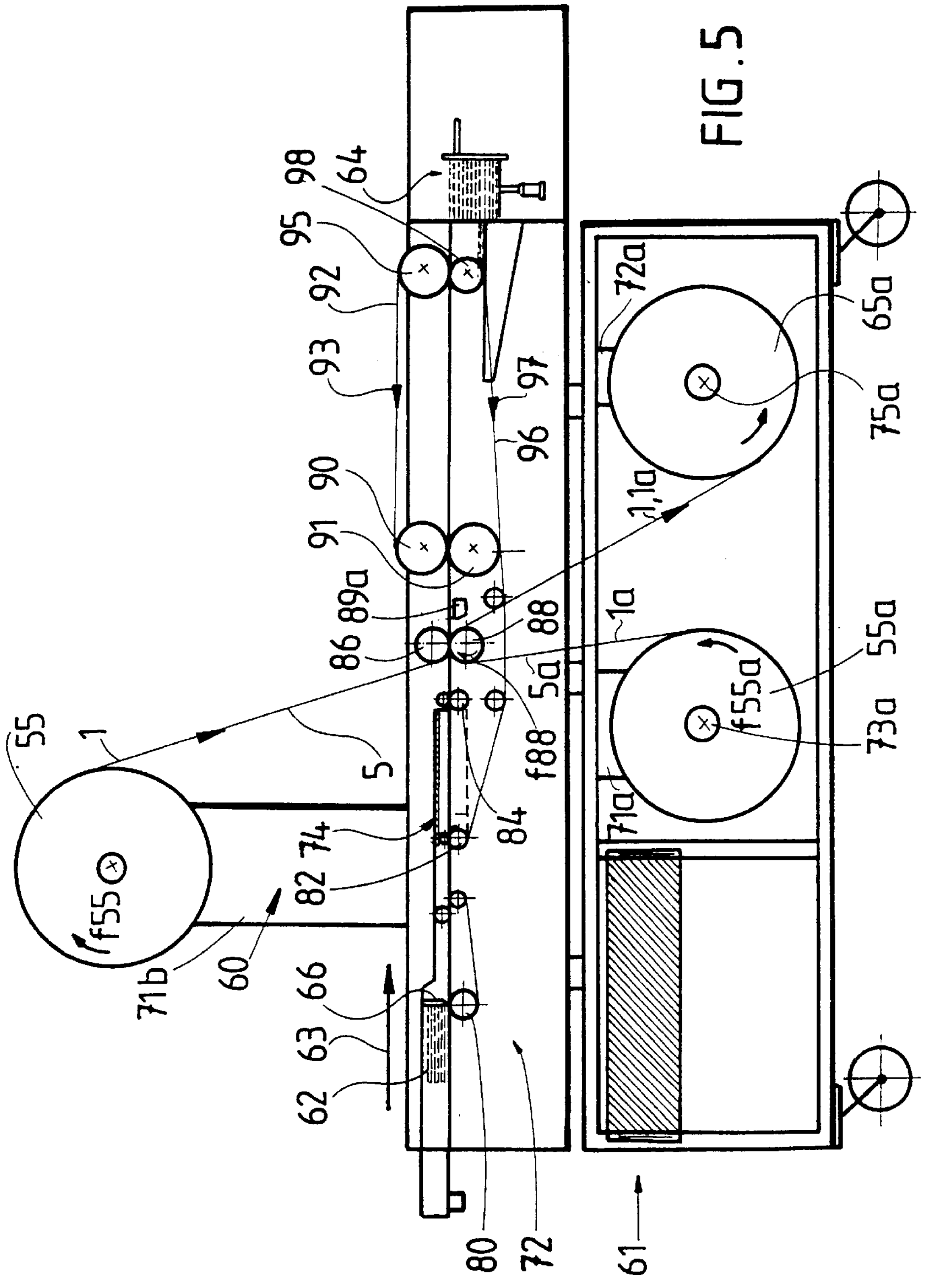
FIG. 5 depicts two variations of the device according to FIG. 4.

Of the two variations of the device of FIG. 4 that are shown in FIG. 5, the first variation relates to an embodiment, in which the rolls 55 and 65, which carry the transfer tape 1, are housed in the underframe 61. On the roll 55*a* the transfer tape 1*a* with the pressure sensitive adhesive coating 5*a* is wound onto a sleeve 73*a*, which is attached so as to rotate on a support 71*a*, which is permanently connected to the bearing frame of the substructure 61. The transfer web 1*a* runs over the counter-pressure roller 88, which is driven according to arrow f 88, and from said counter-pressure roller to a sleeve 75*a*, which is attached so as to rotate on another support 72*a*, supported by the substructure 61.

In this embodiment the individual sheets of the stack of sheets 63 are coated with an adhesion promoter or primer on the underside and with a release on the upper side in the drawing according to FIG. 5. The shingling, depicted in FIG. 2, is maintained by the shingling and staggering device 74, whereby of each sheet the rear bottom section of width d is exposed for application of pressure sensitive adhesive from the transfer web 1*a*.

The transfer web 1*a* is pulled through the counter-pressure roller 88 together with the shingled or staggered sheets through the slit between the counter-pressure roller 88 and the feed roller 86, whereby the transfer web 1*a* is forced from below against the stream of sheets. The stream of sheets, leaving the two rollers, is severed from the transfer tape 1*a* by means of the separating strip 89*a*, arranged here below said sheet stream, and is grasped by a downstream suction roller 90, which together with a roller 91, which runs concomittantly with it and is arranged below it, forms another roller slit. A continuous upper belt 92, comprising several parallel belts, revolves according to arrow 93 around the suction roller 90 and a roller 95 arranged downstream of said suction roller; and a bottom belt 96, which also exhibits several parallel belts, revolves according to arrow 97 around the roller 91 and a roller 95, which is arranged downstream of said roller below the roller 95. The distance between suction roller 90 with assigned roller 91 and the separating strip 89*a* is adjustable and a function of the blank length. The suction roller 90 and the other rollers 91, 95, 98 rotate so fast that the shingled or staggered sheets are singulated again. The sheets, which are singulated in this manner along the feed path between the pair of suction rollers 90 and 91 and the pair of rollers 96, 98, are delivered into the sheet collector 64 and stacked. In this sheet collector are the individual sheets, which lie one on top of the other and whose rear bottom edge in the feed direction is coated with pressure sensitive adhesive over the width d (except for the bottom-most sheet of the stack).

The second variation of the device, according to FIG. 5, provides as another design of the invention a diminished stand 71*b*, which rises above the device 60 and on which the roll 55 can rotate in the direction of the arrow f 55, as in the embodiment depicted in FIG. 4. The counter-pressure roller 88 pulls the transfer tape 1, coated with pressure-sensitive adhesive 5, together with the shingled or staggered sheets, according to FIG. 2, into the roller slit between the counter-pressure roller 88 and the feed roller 86, whereby the transfer web 1 is forced from above onto the stream of sheets and transfers the presssure sensitive adhesive to the individual sheets, whose upper side in this embodiment is coated again with primer and whose bottom side is coated with a release.

On the downstream side of the roller slit between the rollers 86, 87 the transfer web 1 runs onto the sleeve 75*a*, which is mounted rotatably in the underframe 61 of the device. In so doing, the shingled or staggered sheets are dragged along by the transfer web 1 and wound with the transfer web, forming the roll 65*a*.

In contrast to the embodiment of the invention, where the sleeve 75*a*, like the sleeve 75, is held above the stream of sheets, the transfer tape in the last embodiment is wound with the shingled or staggered sheets in such a manner onto the sleeve 75*a* that the sheets lie outside. Of course, in this embodiment of the invention there is no need for a singulation station, including the suction roller and the related other rollers, or the sheet collector 64 or the separating strip 89*a*.

I claim:

1. Apparatus for applying pressure sensitive adhesive from a transfer web to sheets having an upper side coated with an adhesion promoter, said transfer web having an upper surface coated with a first releasing agent and a bottom surface coated with a second releasing agent, said second releasing agent having a greater peel force than said first releasing agent, said first releasing agent coated with a self-adhering pressure sensitive adhesive, which pressure sensitive adhesive is transferable from said web to said sheets, wherein said apparatus comprises a first web storage device for rotatably holding a supply roll, said supply roll having the transfer web wound thereon; a transfer section including a deflecting roller for the transfer web and a feed roller coacting with said deflecting roller and defining a slit therebetween for receiving said transfer web; a second web storage device having a receiving roll for receiving said transfer web; a feeder for feeding said sheets to the slit defined by said deflecting roller and said feed roller, wherein said pressure sensitive adhesive is transferred from said transfer web to said sheets.

2. The apparatus of claim 1 wherein said sheets are fed to the slit in a shingled manner, whereby the leading edge of a following sheet lies over the preceding sheet.

3. The apparatus as claimed in claim 1 wherein said sheets are fed to said slit in a staggered manner, whereby the leading edge of a following sheet lies over the preceding sheet.

4. The apparatus as claimed in claim 1 further comprising a sheet removing device for contacting one of a stack of sheets at a contact surface thereof, whereby the sheets are removed one sheet at a time from the bottom of the stack at a first rate; a shingling/staggering device for receiving the sheets from said sheet removing device and decelerating the sheets so that the sheets are shingled/staggered such that adjacent sheets overlie each other to leave a free surface of a height d.

5. The apparatus of claim 4 wherein said shingling/staggering device decelerates said sheets in accordance with a predetermined height d.

6. The apparatus of claim 1 further comprising a means for pulling off the transfer web at an acute angle relative to the direction of feed of said sheets wherein said sheets are dragged by said pressure sensitive adhesive on said transfer web and wound with said transfer web on said receiving roll.

7. The apparatus as claimed in claim 1 further comprising a means for pulling off said transfer web at an obtuse angle relative to the direction of feed of said sheets such that said sheets are separated from said transfer web and collected in a sheet collector.

8. The apparatus as claimed in claim 7 wherein said means for pulling off is a deflecting strip for deflecting the transfer web at an obtuse angle relative to the direction of feed of said sheets, said deflecting strip positioned adjacent said deflecting roller.

9. The apparatus as claimed in claim 1 wherein said pressure sensitive adhesive comprises an aqueous dispersion with a self-adhering bead polymerizate.

* * * * *